United States Patent [19]

Sampson et al.

[11] Patent Number: 5,909,541
[45] Date of Patent: Jun. 1, 1999

[54] ERROR DETECTION AND CORRECTION FOR DATA STORED ACROSS MULTIPLE BYTE-WIDE MEMORY DEVICES

[75] Inventors: Neil L. Sampson, Phoenix; Scott L. Gray, Glendale; Gary Walker, Phoenix, all of Ariz.

[73] Assignee: Honeywell Inc., Minneapolis, Minn.

[21] Appl. No.: 08/668,309

[22] Filed: Jun. 26, 1996

Related U.S. Application Data

[63] Continuation of application No. 08/092,405, Jul. 14, 1993, abandoned.

[51] Int. Cl.$^6$ .................................................. G06F 11/08
[52] U.S. Cl. .................................... 395/182.04; 371/40.2; 371/68.1
[58] Field of Search ..................... 395/182.04, 182.11; 371/67.1, 68.1, 40.11, 40.2, 40.3, 40.4; 711/115, 153, 173

[56] References Cited

U.S. PATENT DOCUMENTS

| | | | |
|---|---|---|---|
| 4,358,823 | 11/1982 | McDonald et al. | 364/200 |
| 4,359,772 | 11/1982 | Patel | 371/38.1 |
| 4,450,561 | 5/1984 | Gotze et al. | 371/37.6 |
| 4,486,834 | 12/1984 | Kobayashi et al. | 395/425 |
| 4,617,664 | 10/1986 | Aichelmann, Jr. et al. | 371/37.7 |
| 4,862,463 | 8/1989 | Chen | 371/40.12 |
| 4,907,228 | 3/1990 | Bruckert et al. | 371/68.3 |
| 4,965,717 | 10/1990 | Cutts, Jr. et al. | 395/575 |
| 5,086,429 | 2/1992 | Gray et al. | 371/9.1 |
| 5,136,704 | 8/1992 | Danielson et al. | 395/182.09 |
| 5,146,589 | 9/1992 | Peet, Jr. et al. | 395/575 |
| 5,239,637 | 8/1993 | Davis et al. | 395/425 |
| 5,249,187 | 9/1993 | Bruckert et al. | 371/68.1 |
| 5,271,023 | 12/1993 | Norman | 371/68.3 |
| 5,276,823 | 1/1994 | Cutts, Jr. et al. | 395/575 |
| 5,291,496 | 3/1994 | Andaleon et al. | 371/3 |

OTHER PUBLICATIONS

Parker, "Dictionary of Scientific & Technical Terms", p. 288; McGraw–Hill.
Microsoft Press, "Computer Dictionary", 1994, p. 59.
Eiji Fujiwara, Dhiraj K. Phadhan, "Error–Control Coding in Computers", Computer, IEEE (Jul. 1990).

*Primary Examiner*—Robert W. Beausoliel
*Assistant Examiner*—Scott T. Baderman

[57] ABSTRACT

A digital computing system includes a first and second processor clocked for locked step operation. A shared memory stores a linear block codeword across a plurality of byte-wide memory devices. The codeword includes a first dataword and a second dataword. Each of the first and second datawords includes an equal plurality of databits and each includes an equal plurality of checkbits associated therewith. First error detection and correction logic connected to the first processor receives the first dataword and checkbits associated therewith of the codeword addressed by the first processor and a second dataword and checkbits associated therewith of the codeword addressed by the second processor. First error detection and correction logic detects and/or corrects errors in the codeword. Second error detection and correction logic connected to the second processor receives the second dataword and checkbits associated therewith of the codeword addressed by the second processor and the first dataword and checkbits associated therewith of the codeword addressed by the first processor. The second error detection and correction logic detects and/or corrects errors in the codeword.

20 Claims, 12 Drawing Sheets

$$H = \begin{array}{l}
80\text{'b}1100\_0100\_1100\_0100\_1100\_0100\_1100\_0100\_1100\_0100 \\
80\text{'b}1110\_0000\_1111\_0000\_1111\_0000\_1111\_0000\_1111\_0000 \\
80\text{'b}1010\_1010\_1010\_1010\_1010\_1010\_1010\_1010\_1010\_1010 \\
80\text{'b}0000\_1101\_0000\_1101\_0000\_1101\_0000\_1101\_0000\_1101 \\
80\text{'b}1100\_1000\_0110\_0100\_1011\_0010\_0101\_1001\_1010\_1100 \\
80\text{'b}0101\_1001\_1010\_1100\_1101\_0110\_1110\_1011\_1111\_0101 \\
80\text{'b}1011\_0010\_0101\_1001\_1010\_1100\_1101\_0110\_1110\_1011 \\
80\text{'b}0110\_0100\_1011\_0010\_0101\_1001\_1010\_1100\_1101\_0110 \\
80\text{'b}1011\_1100\_1010\_1100\_1010\_1100\_1010\_1100\_1010\_1100 \\
80\text{'b}0101\_0110\_0101\_0110\_0101\_0110\_0101\_0110\_0101\_0110 \\
80\text{'b}0011\_0011\_0010\_0011\_0010\_0011\_0010\_0011\_0010\_0011 \\
80\text{'b}1001\_0001\_1001\_0001\_1001\_0001\_1001\_0001\_1001\_0001 \\
80\text{'b}0000\_0011\_0010\_0110\_0100\_1101\_1001\_1010\_0011\_0101 \\
80\text{'b}1001\_1010\_0011\_0101\_0110\_1011\_1101\_0111\_1010\_1111 \\
80\text{'b}0101\_1101\_1001\_1010\_0011\_0101\_0110\_1011\_1101\_0111 \\
80\text{'b}0010\_0110\_0100\_1101\_1001\_1010\_0011\_0101\_0110\_1011
\end{array}$$

ERROR DETECTION AND CORRECTION FOR DATA STORED ACROSS MULTIPLE BYTE-WIDE MEMORY DEVICES

This application is a continuation, of application Ser. No. 08/092,405, filed Jul. 14, 1993 now abandoned.

FIELD OF THE INVENTION

The present invention relates generally to fault-tolerant digital computing systems for applications requiring a high degree of safety. In particular, the present invention pertains to a dual-redundant, fail-passive digital computing system utilizing a shared memory and having error correction and detection capabilities.

BACKGROUND OF THE INVENTION

Some digital computing system applications require a high degree of safety. For example, an aircraft flight control computer for safe operation depends upon continuous error-free computing operation for the entire period of flight. It should be recognized that error-free operation requires the elimination of, or containment of faults within the digital computing system. For many aircraft applications, the probability of an undetected failure must be less than $10^{-9}$ per flight hour. In addition to ever-increasing demands of reliability, a fast computing system with increased throughput is necessary for flight control.

A malfunction of any single component in a conventional computing system will result in an unsafe error. This is known as a series reliability model, wherein the probability of an unsafe error is the sum of the probability of the malfunction of each component. A system corresponding to this model is sometimes referred to as a "single thread system." In prior art computing systems, a single-thread memory system complimented with an off-the-shelf error detection and correction linear block code has been utilized to attempt to meet required failure probability levels. However, such a method does not satisfy required safety levels or processing throughput requirements.

An alternative to the single-thread memory complimented with an off-the-shelf error detection and correction linear block code is to use a fully redundant and independent memory array with an error detection and correction linear block code for each processing lane. Such replication of the computing elements of the computing system and the redundant arrangement thereof produces error free results even though one or more elements are malfunctioning. Although this system may be fail-passive, it is very costly, area inefficient and does not satisfactorily meet throughput requirements.

It is the goal of fault tolerant computing systems to provide the greatest possible reliability with the lowest possible degree of redundancy, since redundancy increases cost, power, and size. In some instances, redundancy actually undercuts the reliability improvements being sought by the added redundancy. Reliability improvement can be directed toward improving the availability of the system, i.e., the percentage of time the system is available to do useful work, or the safety of the system, i.e., the probability that the system will perform error-free for a specified mission time. U.S. Pat. No. 5,086,429 to Gray, et al., issued Feb. 4, 1992 and presently assigned to the assignee hereof, shows a computing system in which error correction capability is sacrificed, decreasing availability, in order to achieve a higher degree of safety.

U.S. Pat. No. 5,086,429 describes a fail-operative, fail-passive, fault tolerant computing system, which includes a first and second pair of substantially identical processors connected to a system bus with one pair being arbitrarily designated as the "active" pair while the other is designated as a "hot stand-by" pair. Each processor is operated in locked step fashion. Rather than providing individual memory arrays for each processor in each pair, the two processors in each pair share a common memory. A bus module examines the binary data and address transmissions carried by data buses and address buses for the active pair to determine whether discrepancy exists in the information being simultaneously transferred over the address and data buses for that pair of processors. The standby pair is likewise configured.

Error detection logic, including a linear block code generator, operates during writes to memory by the processor so as to encode the datawords that are to be written to memory, creating a series of checkbits associated therewith. The datawords along with the checkbits are stored in the memory as a linear block codeword. During a read initiated by the processors, an appropriate codeword is addressed by the processors and read from the memory. The checkbits of the codeword are examined for correctness by a set of syndrome generators, one associated with each processor; the syndrome generators determining whether an error exists in the codeword read from memory. When such an error is detected, a signal is sent to bus monitor logic to cause a switchover such that the designated standby pair becomes the active pair. The faulted pair will record the fault and may either remain faulted, or in the case of a transient or soft fault become the stand-by pair.

It is well known in the prior art to employ a linear block code, also known as an n,k code, comprised of a set of n binary digits wherein any subset of k binary digits represent the data portion of the code and the remaining binary digits, n–k, represent binary digits of the code which may be used for error detection and/or error correction. A specific instance of a given code is commonly called a "codeword." For example, a 9,8 code (8 data bits and 1 error checkbit) can generate 512 unique 9-bit codewords. A 9,8 code provides a simple parity check of an 8-bit dataword which is capable of detecting a single bit error but would miss the detection of an even number of bits in error and provide no capability to correct errors. As the number of checkbits is increased, the capability of the code to detect and/or correct random errors improves because as the number of checkbits increases the fraction of all possible codewords which are valid codewords, decreases, thus increasing the probability that a given error will result in an invalid codeword being detectable.

Hamming weight of a given linear block code is the measure of its error detecting capability, i.e., the Hamming weight is the maximum number of binary digits a given dataword may be in error while still assuring error detection by utilization of the linear block code. When the number of binary digits in error exceeds the Hamming weight, there is the possibility that the error in excess will transfer the codeword into a valid and therefore undetectable codeword. The logical properties of the linear block code generator, usually expressed in the form of a code matrix, and commonly referred to in the art as the H matrix, determines the specific error detection/error correction capabilities of the code.

As indicated above, linear block codes have been used previously for memory error management. However, there exists a need for a computing system utilizing linear block codes which meets ever increasing speed and reliability requirements with reduced redundancy and improved throughput.

SUMMARY OF THE INVENTION

The present invention combines the redundant memory arrays of a traditional two-lane locked step, fail-passive processing pair into a shared memory array. An error detection and correction optimized linear block code is implemented. By routing the codewords written to the shared memory array such that the optimized error detection and correction linear block code is leveraged over multiple datawords, the area of memory and cost of a fault-tolerant, fail-passive digital computing system is significantly reduced. In addition, reliability of the digital computing system and throughput are also increased while necessary safety requirements are met.

The fault-tolerant, fail-passive digital computing system of the present invention, includes a first and second processor which are simultaneously clocked for locked step operation and a shared memory for storing at least one linear block codeword across a plurality of byte-wide memory devices. The codeword includes a first dataword and a second dataword. Each of the first and second datawords includes an equal plurality of data bits and each of the first and second datawords has an equal plurality of checkbits associated therewith. The digital computing system further includes a first error detection and correction module connected to the first processor for receiving the first dataword and checkbits associated therewith of said at least one linear block codeword addressed by the first processor and the second dataword and checkbits associated therewith of the at least one linear block codeword addressed by the second processor. The first error detection and correction module includes logic for detecting and/or correcting one or more memory errors in the linear block codeword. A second error detection and correction module is connected to the second processor for receiving the second dataword and checkbits associated therewith of the at least one linear block codeword addressed by the second processor and the first dataword and checkbits associated therewith of the at least one linear block codeword addressed by the first processor. The second error detection and correction module includes logic for detecting and/or correcting one or more memory errors in the codeword.

In one embodiment of the invention, the first and second error detection and correction module includes logic for detecting and correcting a single bit error while allowing for detection of subsequent errors in the linear block codeword.

An error detection and correction apparatus in accordance with the present invention detects/or corrects errors of a linear block codeword having two datawords and a plurality of checkbits associated therewith, each dataword including a plurality of databits. The apparatus includes detection and correction logic for detecting and correcting any single bit errors in the linear block codeword. In addition, the error detection and correction logic includes logic for detecting and reporting any two bits in error in the linear block codeword, logic for detecting and reporting any byte-wide errors, wherein the byte-wide error is confined to within the bits within byte-wide boundaries of byte-wide memory devices of a memory, and logic for detecting and reporting a single bit error when a byte-wide error has already been detected.

In addition, a dual-lane processing method of reading a linear block codeword from a shared memory in a dual lane processing system with a first and second processor is described in accordance with the present invention. The shared memory has at least one linear block codeword stored across byte-wide memory devices therein. The codeword has two datawords with each dataword having a plurality of databits and each dataword having a plurality of checkbits associated therewith. The method includes addressing the first dataword and checkbits associated therewith with an address from the first processor and addressing the second dataword and checkbits associated therewith with a second address from the second processor. The addressed first dataword and associated checkbits is routed for combination with the addressed second dataword and associated checkbits to form a first error detectable and correctable codeword for the first processor. The addressed second dataword and associated checkbits are routed for combination with the addressed first dataword and associated checkbits to form a second error detectable and correctable codeword for the second processor. Any single bit errors are corrected while allowing detection of subsequent errors in the first and second error detectable and correctable codewords. The first and second datawords of the first error detectable and correctable codeword are pipelined to the first processor and the first and second datawords of the second error detectable and correctable codeword are pipelined to the second processor.

BRIEF DESCRIPTION OF THE DRAWINGS

FIG. 1 is a block diagram of a digital computing system in accordance with the present invention.

FIG. 2 is a more detailed block diagram of the digital computing system as shown in FIG. 1.

FIG. 3 is a block diagram of the error detection and correction module of the digital computing system as shown in FIG. 1.

FIG. 4 is an H matrix for the error detection and correction module of FIG. 3.

FIG. 5 is a more detailed block diagram of the error detection and correction module as shown in FIG. 3.

DESCRIPTION OF THE PREFERRED EMBODIMENT

Figure 1A:
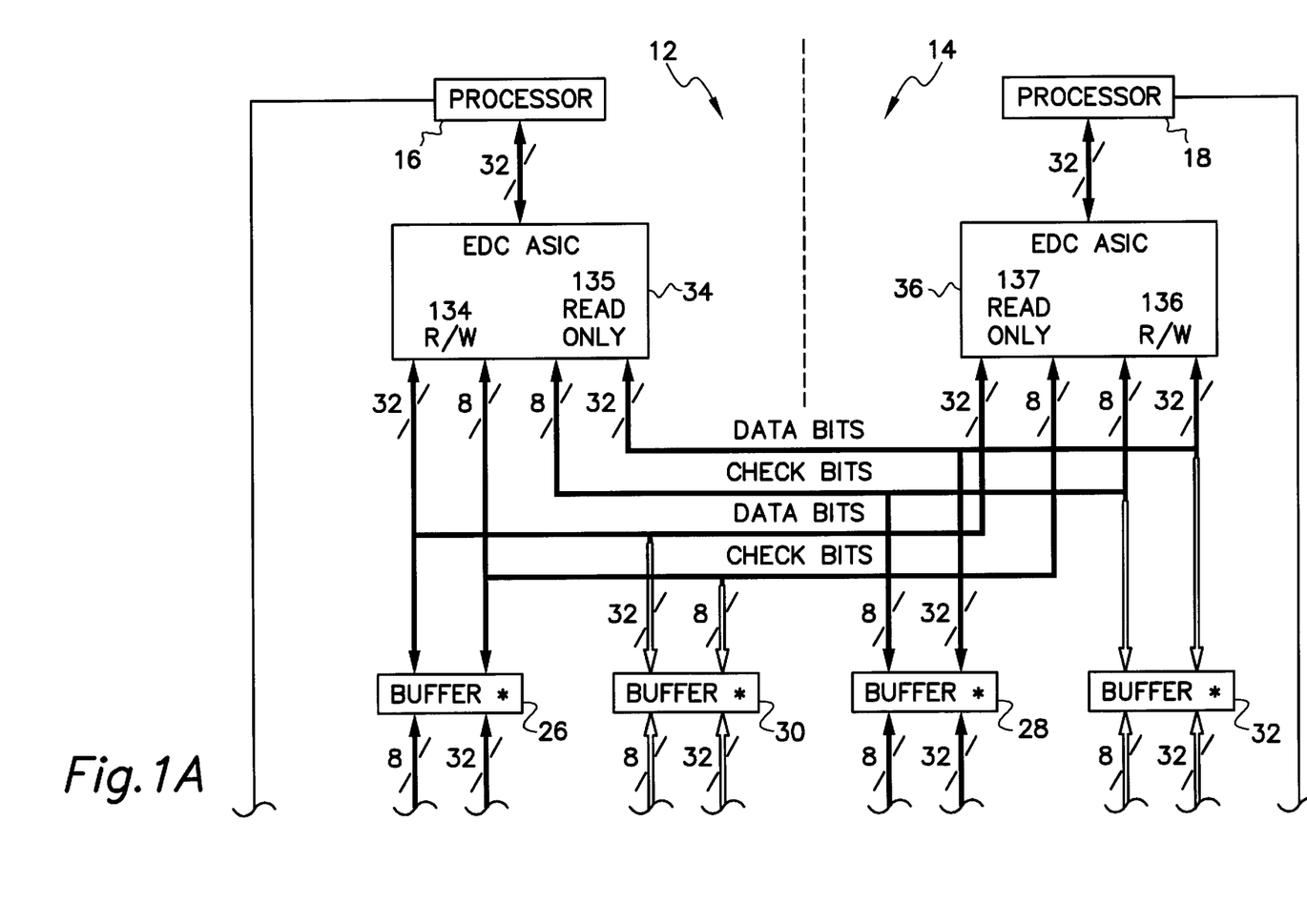
Figure 1B:
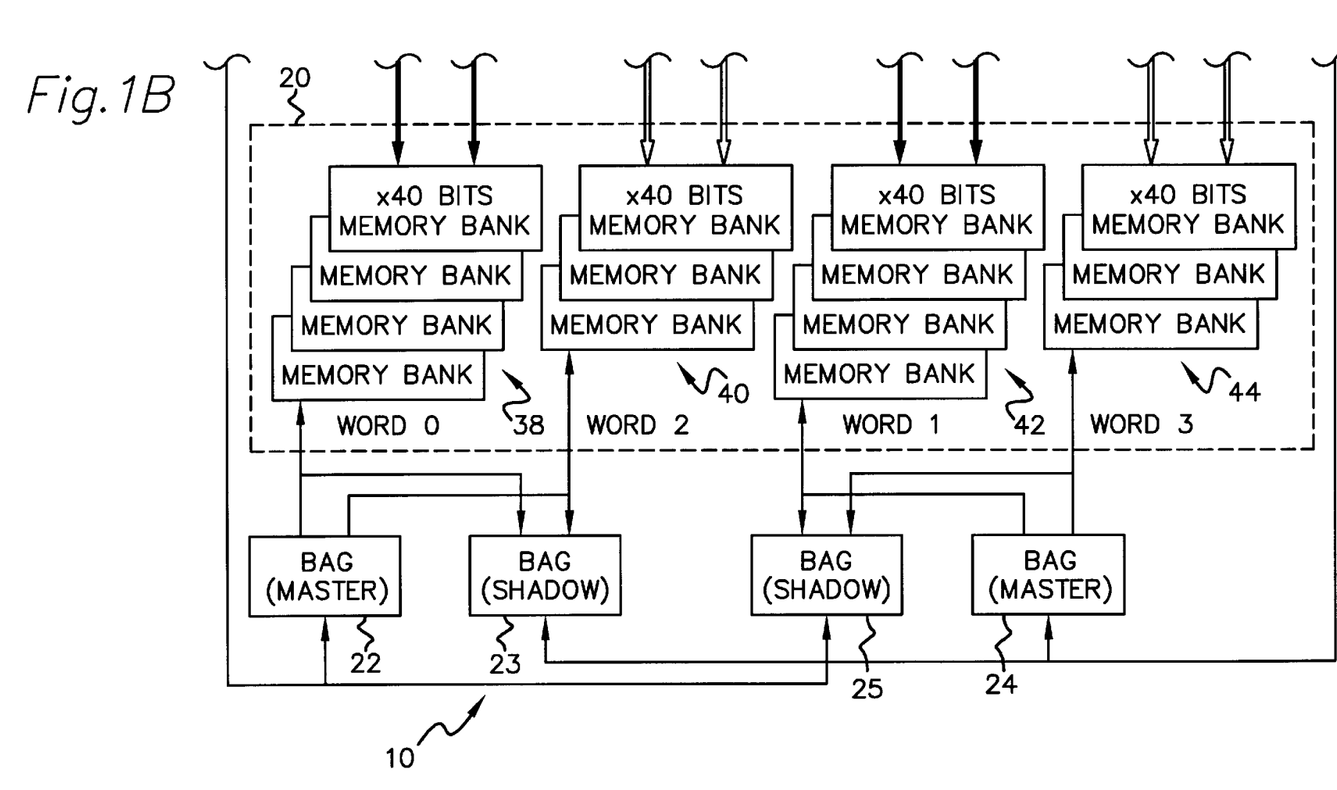

With reference to FIG. 1, the fault tolerant, fail-passive digital computing system 10 in accordance with the present invention shall be described. The digital computing system 10 leverages a linear block code over two processor datawords to reduce the amount of redundancy in a common shared memory while increasing throughput and meeting safety and availability requirements. The fault tolerant, fail-passive digital computing system 10 is a dual redundant lane system including left lane 12 and right lane 14. Left lane 12 of system 10 includes processor 16 which is connected to burst address generator(BAG)(Master) 22 and BAG (Shadow) 25 by an address bus. Processor 16 is also connected to error detection and correction (EDC) module 34 which is an application specific integrated circuit (ASIC) by a bi-directional data bus. Right lane 14 of digital computing system 10 includes processor 18 which is coupled to BAG(Master) 24 and BAG(Shadow) 23 by an address bus and coupled to EDC module 36 by a bi-directional data bus. Processor 16 of left lane 12 and processor 18 of right lane 14 run in clock synchronism for operation in locked step fashion. The digital computing system 10 includes a common shared memory 20 which includes memory banks 38, 40, 42 and 44 for storing linear block codewords written thereto by processor 16 and 18 via EDC modules 34,36 as will be explained further below with reference to FIGS. 2–5. The common shared memory 20 is connected to both EDC modules 34,36 via a bi-directional data bus and buffers 26, 28, 30 and 32. Each processor may be a 29050 processor manufactured by and available from Advanced Micro Devices (AMD).

The digital computing system 10 utilizes an [80,64] linear block code to achieve a single bit error correct, double random bit error detect, single 8-bit byte detect and a single bit random error detect (SEC-DED-$S_8$ED+1) system. This code allows the digital computing system 10 to correct single bit faults and still allow for detection of subsequent memory faults. The [80, 64] linear block code, uses an 80 bit codeword where 64 bits are databits and the remaining 16 bits are checkbits generated by the EDC modules 34, 36 of the dual lane system. Each 80 bit codeword read from the common shared memory 20 includes two 32-bit datawords. The linear block code detects and corrects any one bit in the 80 bit codeword that is in error. If there are two bits in error anywhere in the codeword, then the code will also detect 100% of those errors. The linear block code also allows for detection of 100% of byte-wide errors where the error is confined to within an 8-bit byte memory device boundary as shall be explained further below with reference to FIGS. 2–5. Lastly, it is also possible to detect 100% of errors where one byte is faulted and any other single bit is at fault. Thus, correction of single bit faults does not reduce the level of safety that the code provides. By leveraging a linear block code over two datawords, the system is capable of reporting faults to both processing lanes of locked stepped processors with greater speed allowing for better fault handling.

Figure 2A:
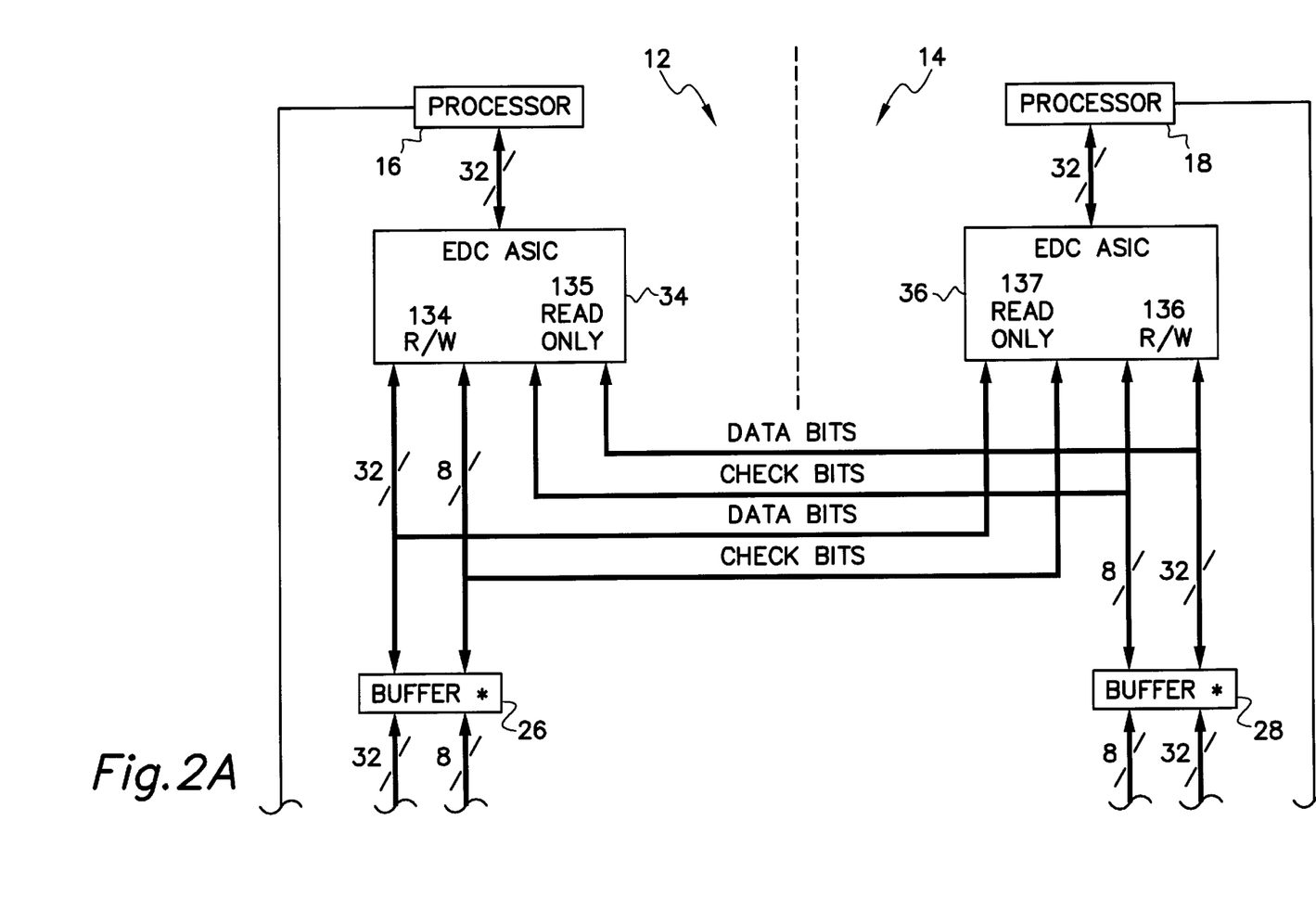
Figure 2B:
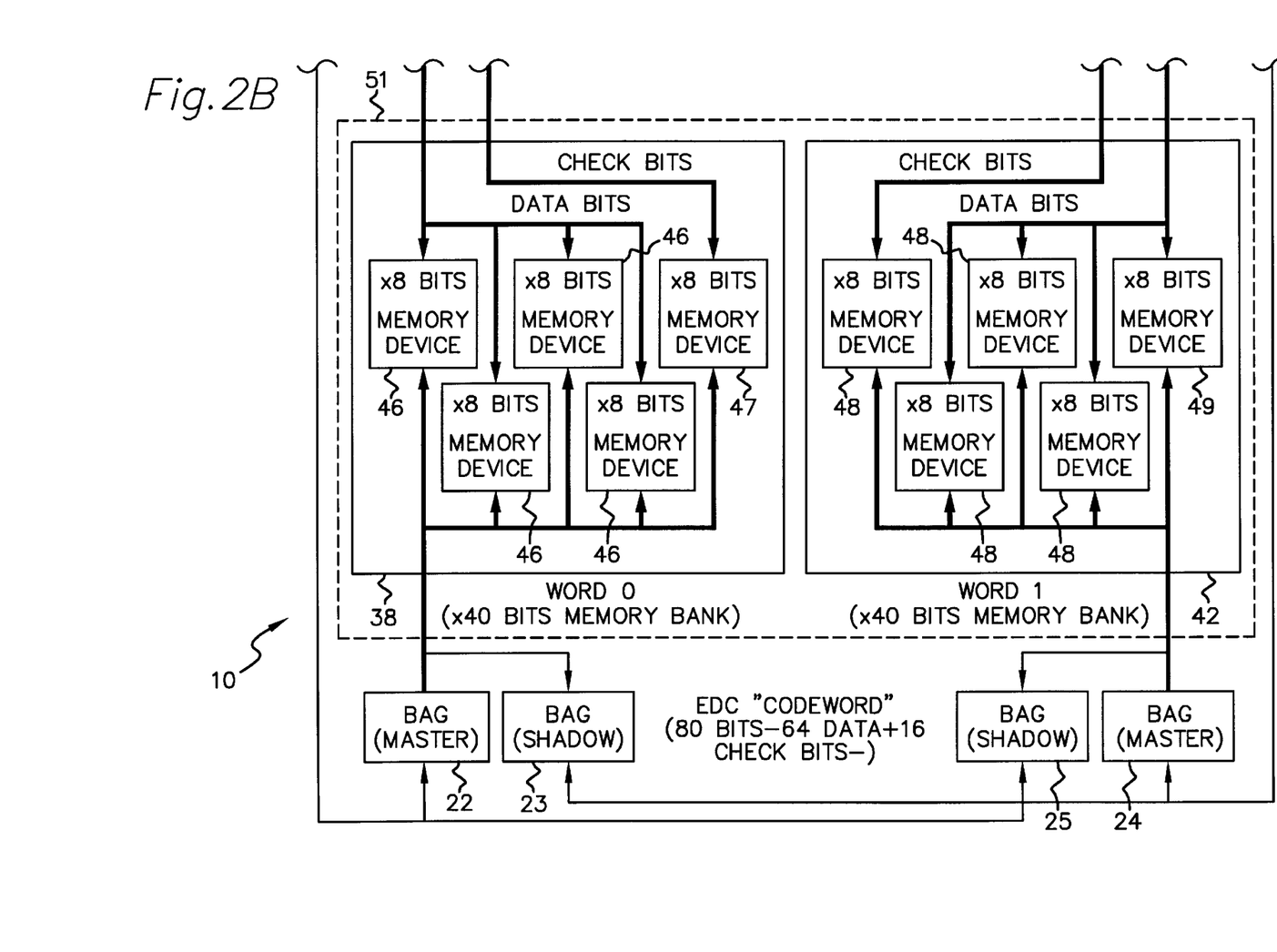
Figure 3A:
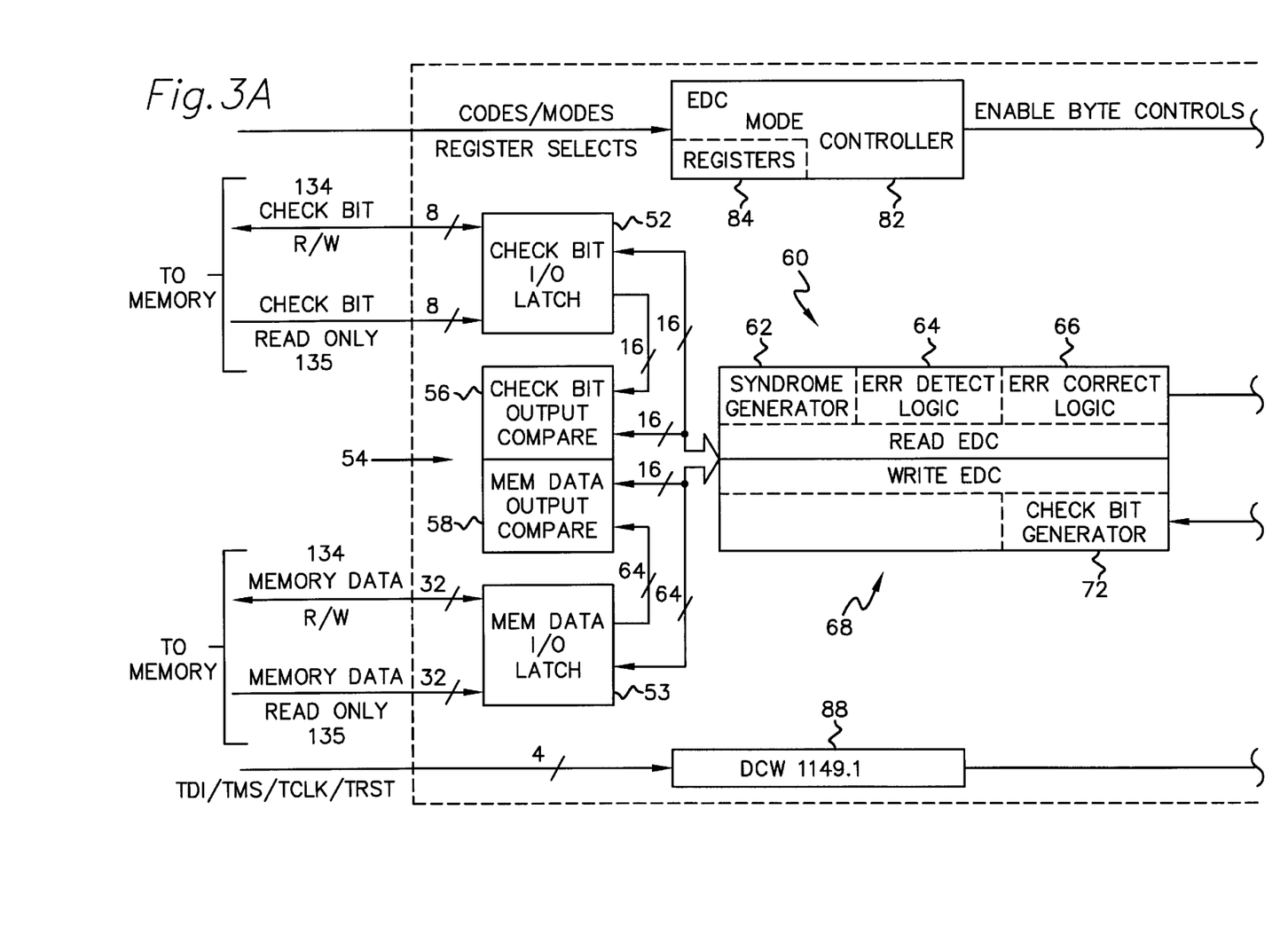
Figure 3B:
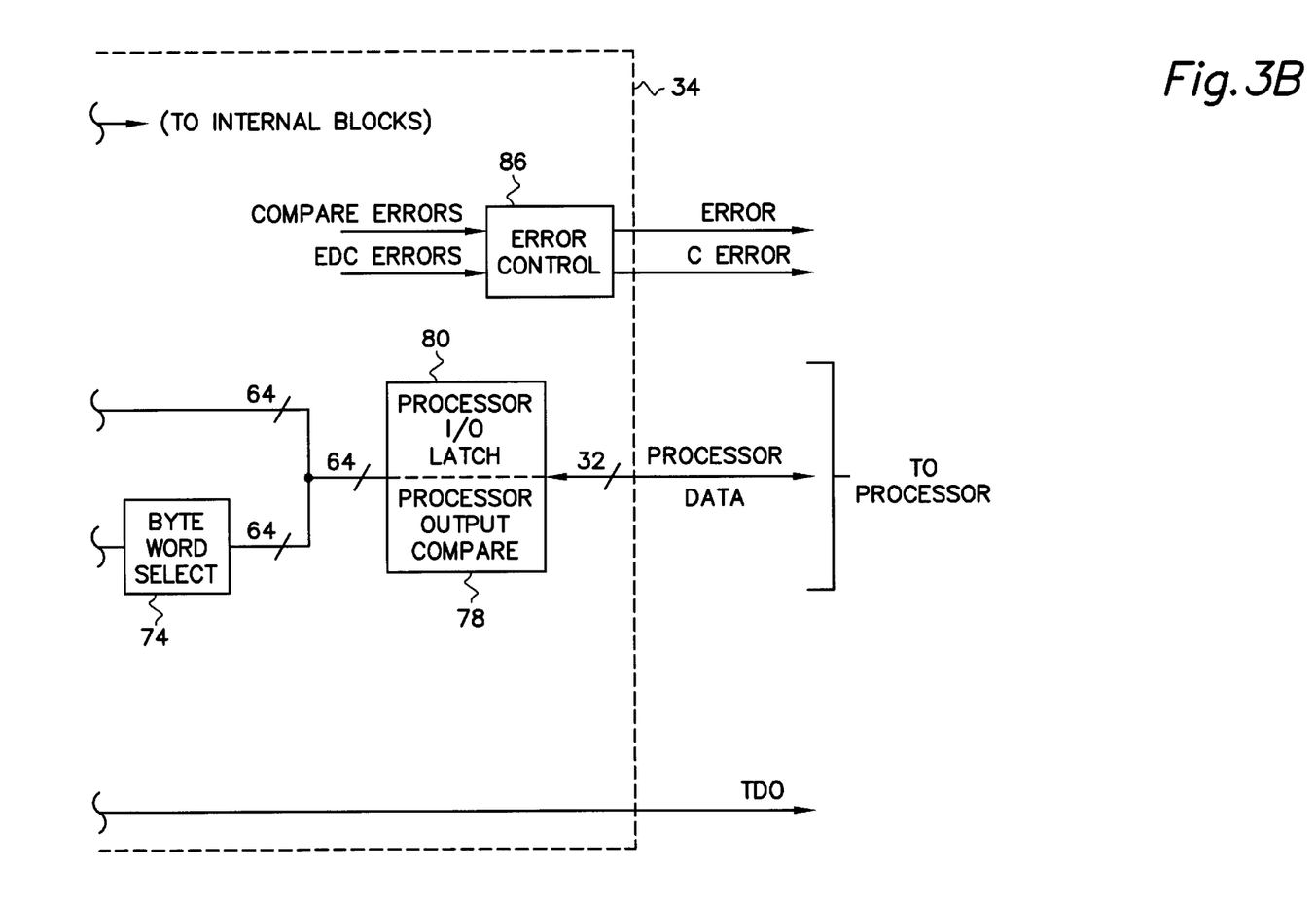
Figure 4A:
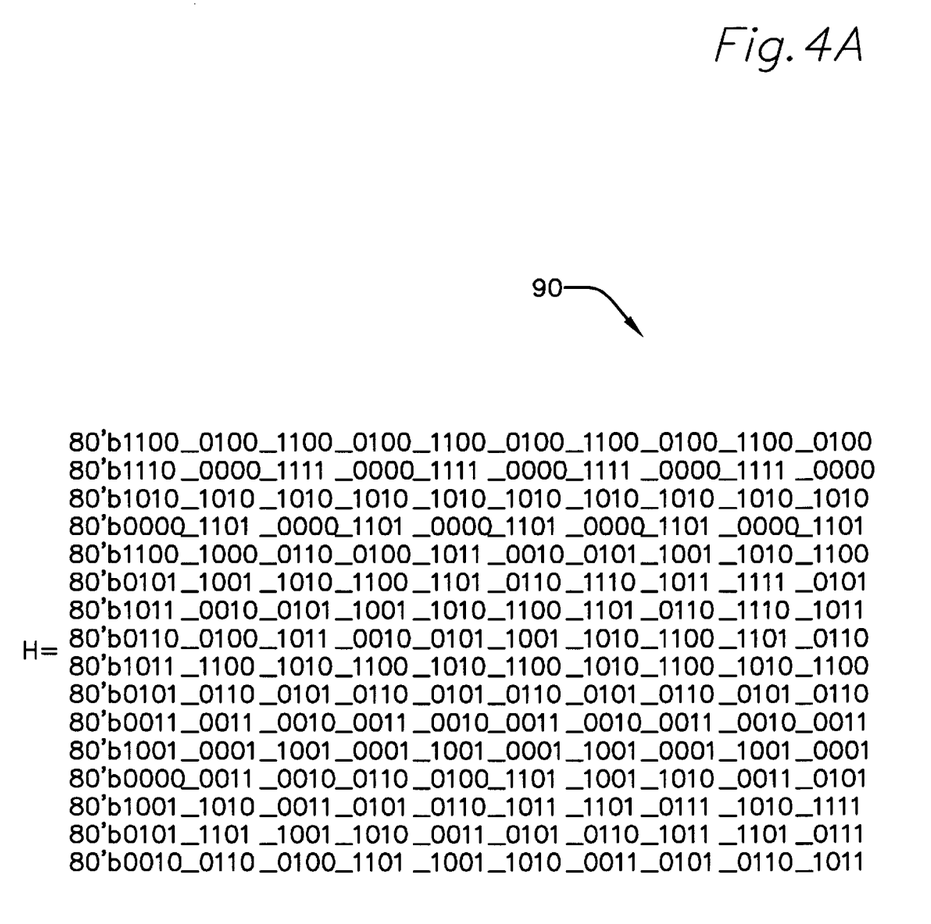
Figure 4B:
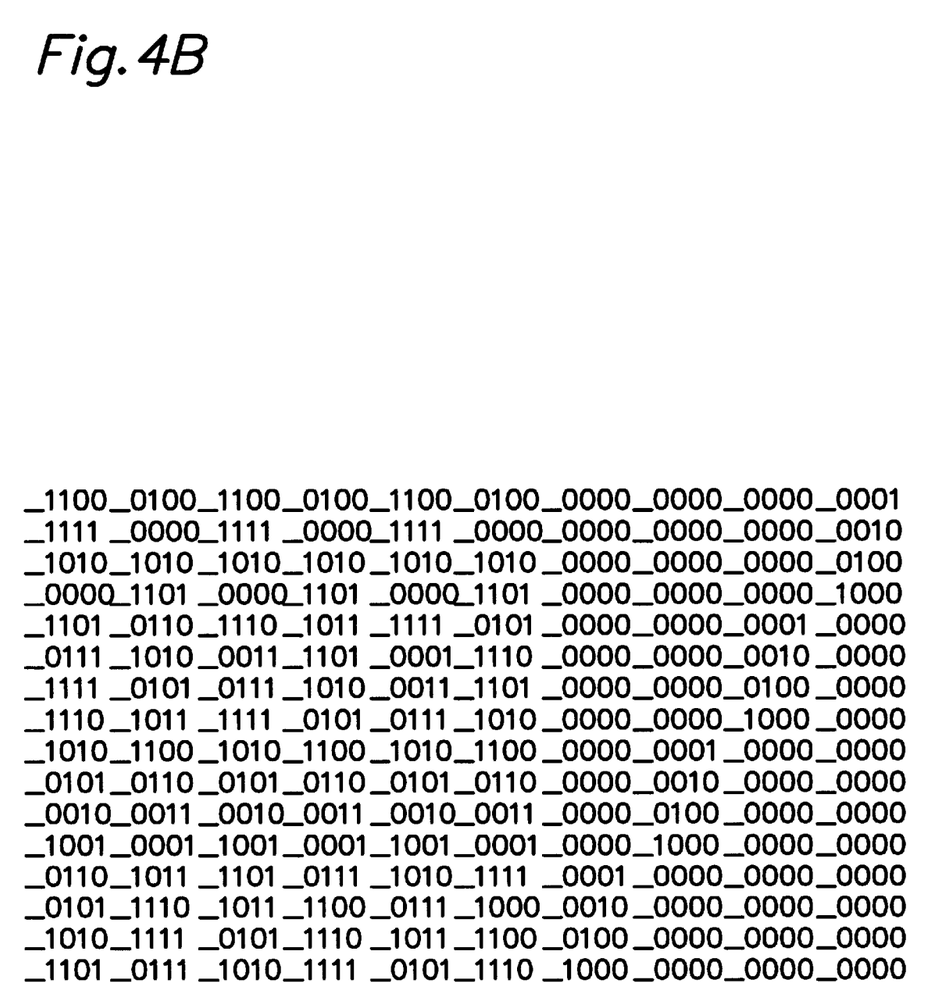
Figure 5A:
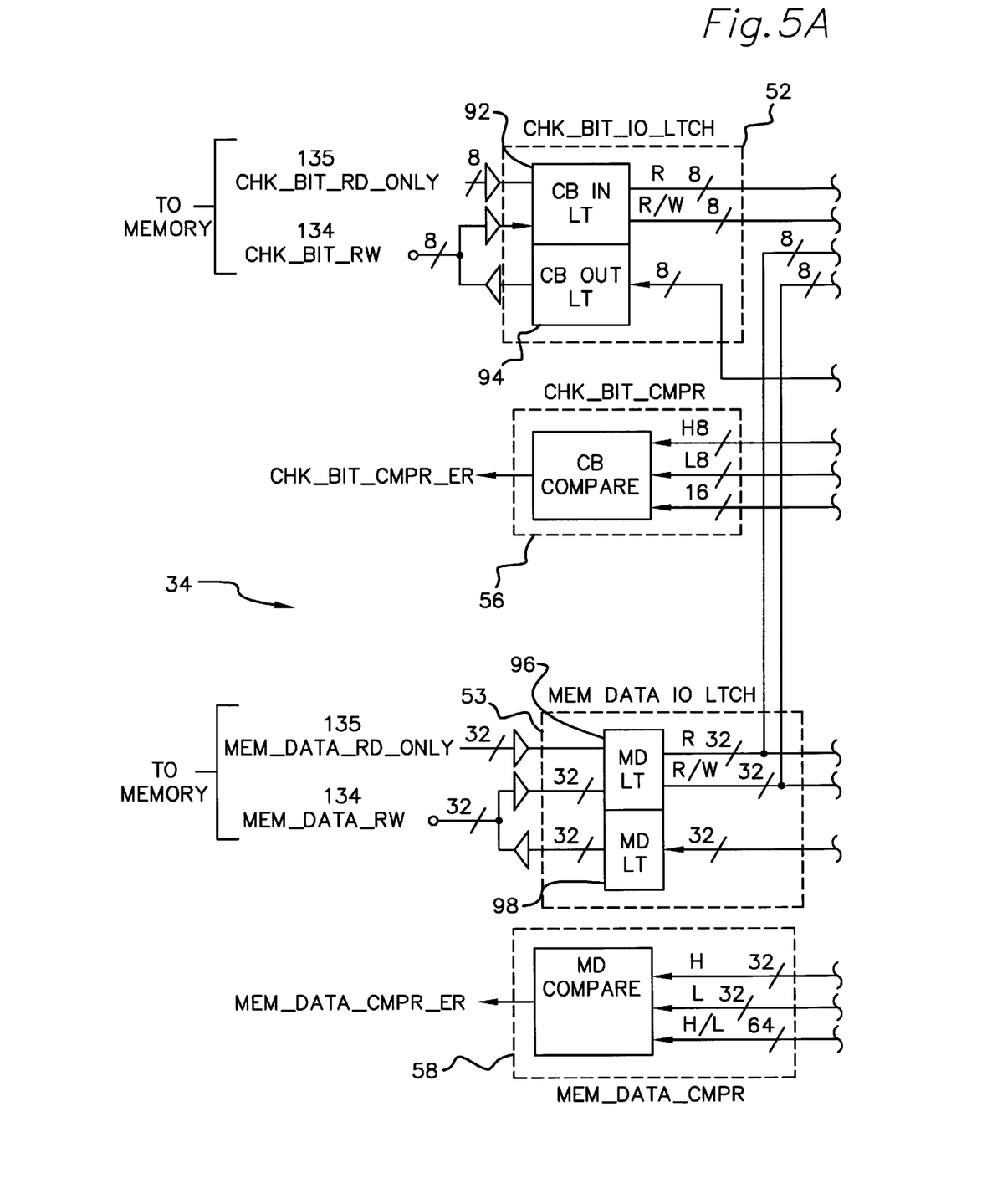
Figure 5B:
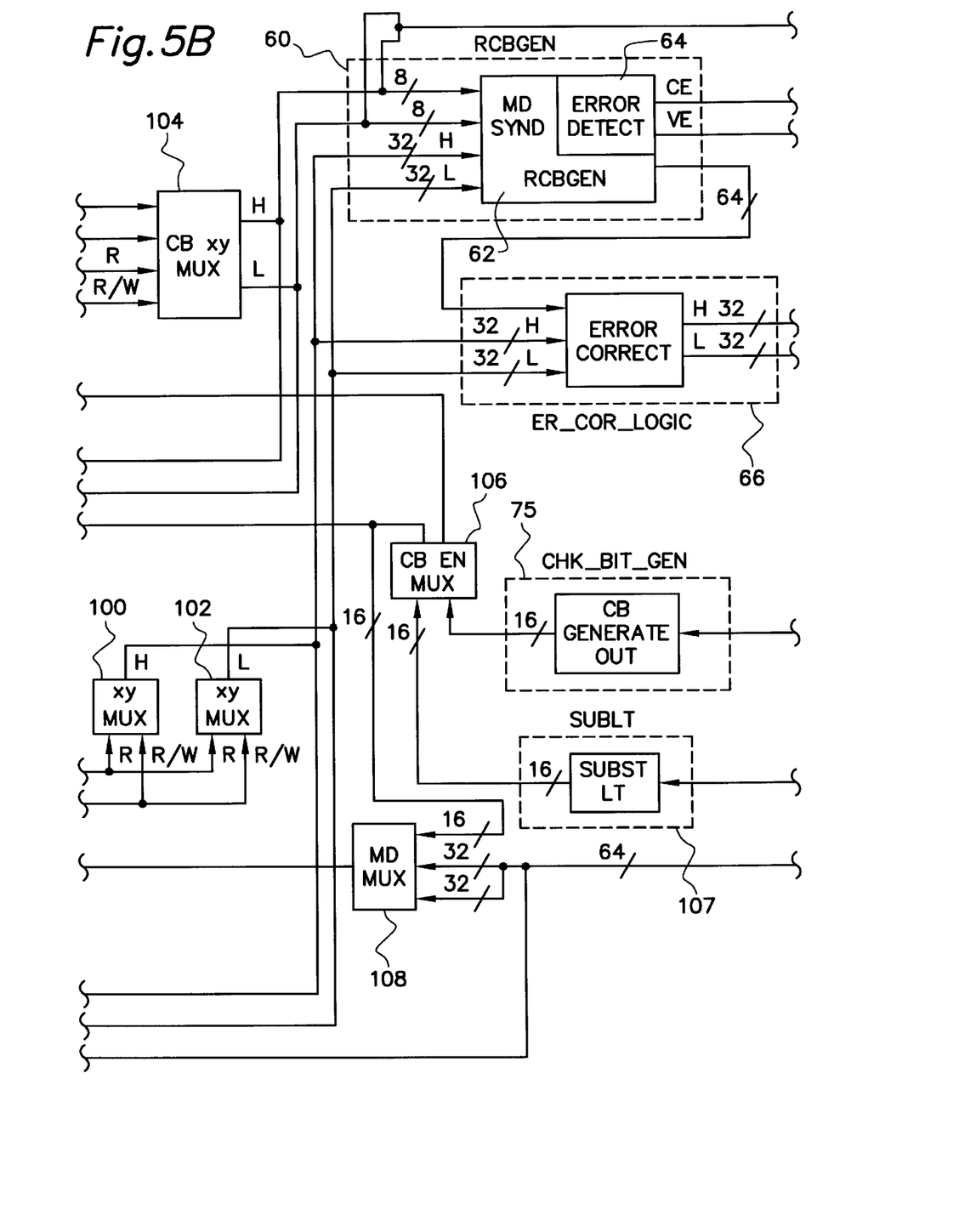
Figure 5C:
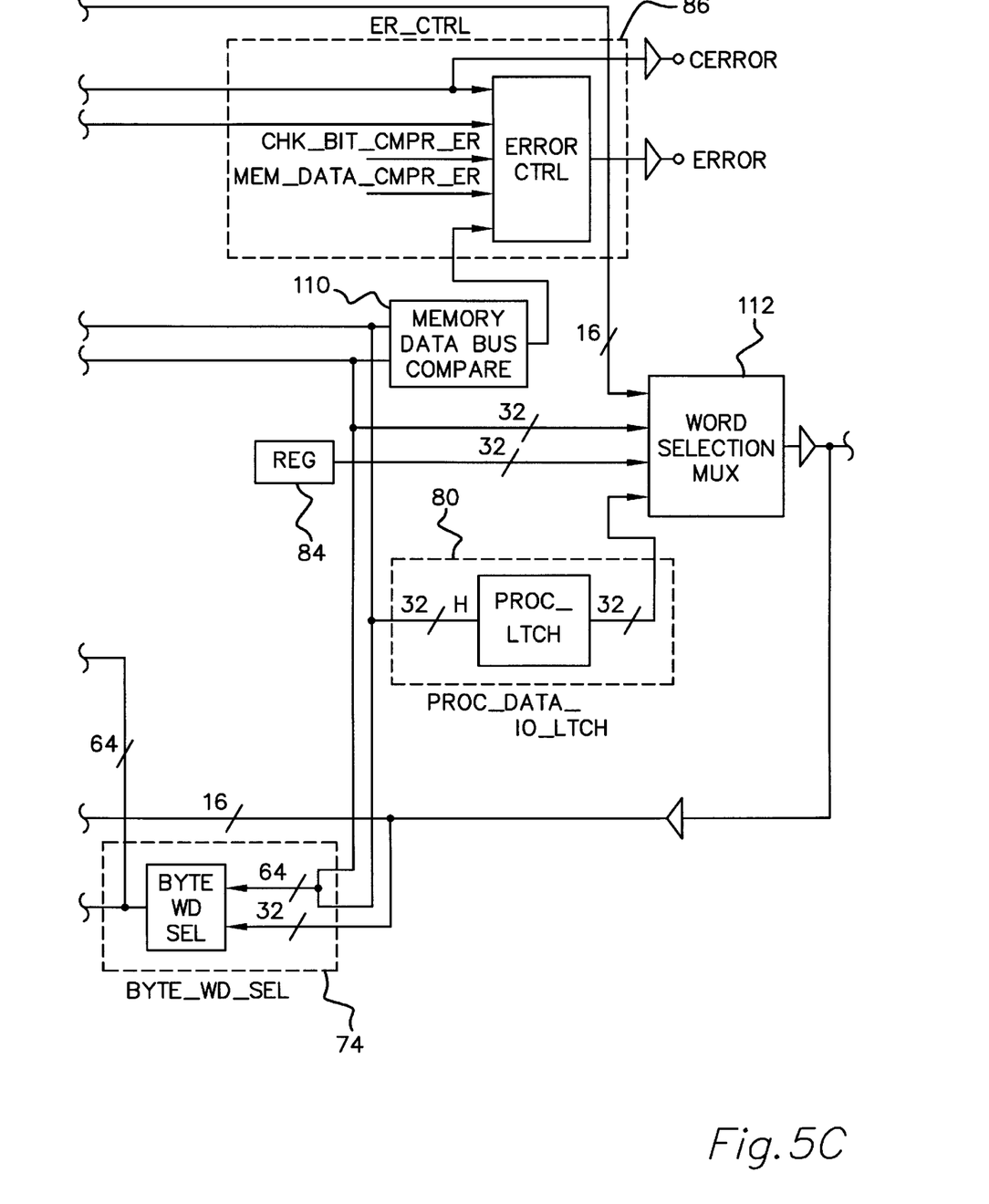
Figure 5D:
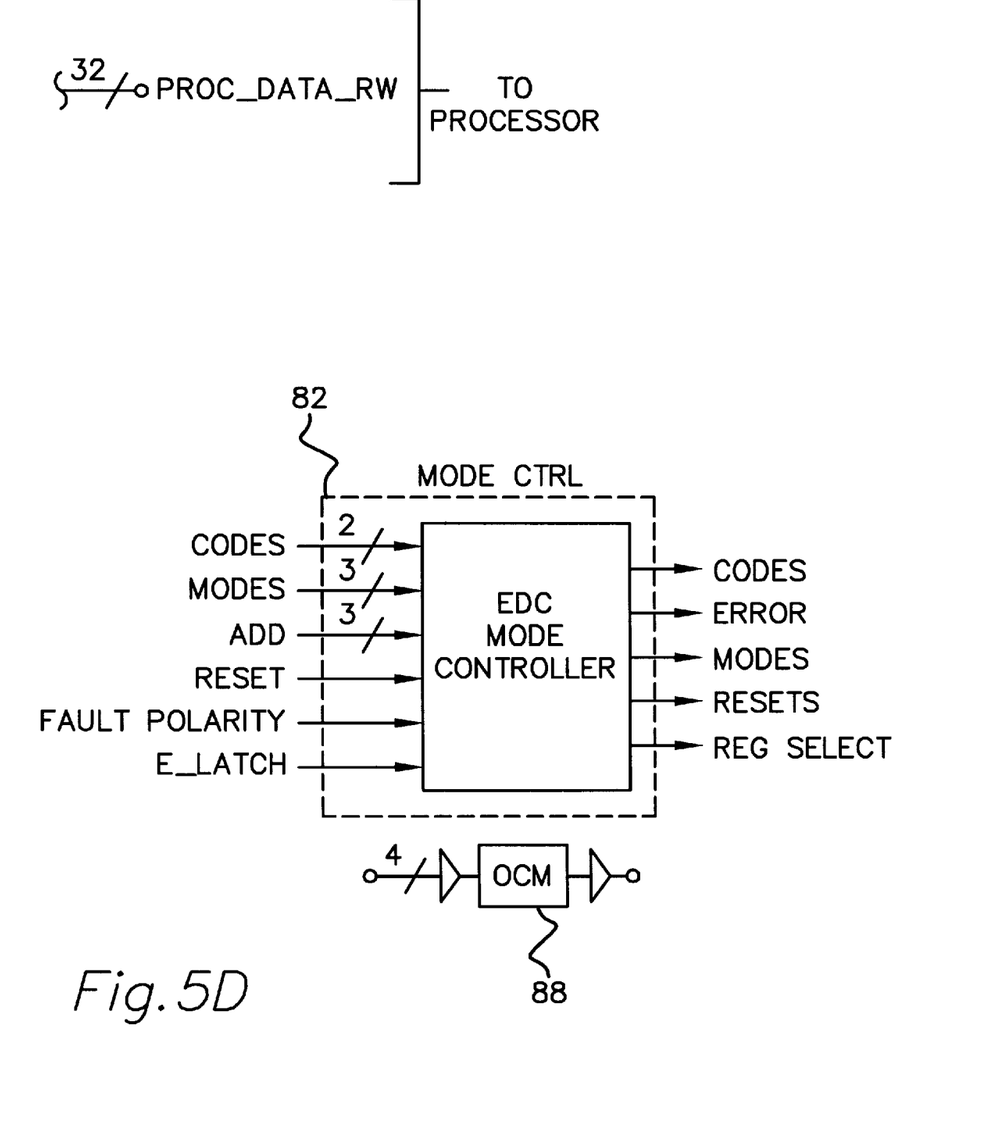

With reference to FIGS. 2–4, a write to memory 20, FIG. 1, by processors 16,18 of left and right lanes 12, 14 and a read from memory 20 by processors 16,18 shall be described in further detail. The shared memory 20 in FIG. 2 is simplified to show only one layer 51 thereof including memory banks 38,42. The memory banks have ten byte-wide memory devices 46–49, to accommodate one linear block codeword. On a write to shared memory 20 by processors 16,18, each redundant processor 16,18 puts the address of the location in shared memory where the data is to be stored on its respective address bus and two 32-bit datawords are applied by processors 16,18 via the data bus to the respectively connected EDC modules 34, 36. As this is a dual redundant lane system and the processors are operating in locked step operation, the datawords applied to the EDC modules 34,36 are equivalent. Each of the EDC modules 34, 36 are represented by the block diagram of FIG. 3, and the more detailed block diagram of FIG. 5 which will be explained later. For simplicity, description concerning FIG. 3 and numerical references thereof are provided with regard to the left lane 12 to show inputs, outputs, connections and elements only of EDC module 34. By symmetry, one skilled in the art will understand the operation of right lane 14 and EDC module 36 in connection with common shared memory 20 and processor 18.

The EDC module 34, FIG. 3, includes a read/write port 134, and a read-only port 135 and EDC module 36 includes a read/write port 136 and a read-only port 137. The read/write port 134 is connected to memory bank 38 via buffer 26 and to the read-only port 137 of EDC module 36. The read-only port 135 is connected to the read/write port 136 of EDC module 36 and memory bank 42 via buffer 28. The read-only port 137 and read/write port 136 of EDC module 36 are similarly connected as is shown in FIG. 2. On a write to memory 20, two 32-bit datawords are applied by processor 16 to byte word select 74, FIG. 3, of EDC module 34 via processor I/O latch 80. The checkbit generator 72 of write EDC circuitry 68 generates 16 checkbits for the two 32-bit datawords to form the 80-bit linear block codeword. The 16 checkbits generated by checkbit generator 72 are applied to checkbit I/O latch 52 and the 64 bits of the two datawords are applied to memory data I/O latch 53. In the same manner, equivalent 32-bit datawords are applied by processor 18 to EDC module 36 and processed thereby. Such operation is conducted under synchronization of clock 88. Then, each of the EDC modules 34,36 writes one part of the 80-bit codeword to the layer 51 of common shared memory 20; noting that each EDC 34,36 writes one half of the 80 bits.

The common shared memory 20, FIG. 1, includes numerous memory banks 38,40,42,44. Each memory bank is 40 bits wide for storing one 32-bit word and 8 checkbits associated therewith. The common shared memory 20 is arranged as layers of 10 memory devices, 46–49. Each layer includes two memory banks. In FIG. 2, memory banks 38 and 42 represent one layer 51 of ten memory devices 46–49. Each of the ten memory devices are 8 bit byte-wide memory devices that share a common address bus. One 80-bit codeword generated by the EDC modules 34,36 is stored across one layer 51 of memory devices 46–49. The memory banks 40,44 and associated buffers 30,32 allow for interleaving operation of the system to access shared memory 20 improving throughput. Such interleaving processes are commonly known to one skilled in the art.

Each EDC module 34, 36 and processor 16,18, respectively, simultaneously writes one of the 32-bit datawords and 8 checkbits associated therewith in the EDC modules I/O latches 52,53 to the layer 51 of memory devices 46–49. For example, EDC module 34 writes dataword Word 0 to memory bank 38 with 8 associated checkbits and EDC module 36 writes data Word 1 to memory bank 42 with 8 associated checkbits.

When one of the 32-bit datawords is written to memory devices 46 of memory bank 38 via buffer 26 and eight checkbits associated with the 32 bit dataword are written to memory device 47 of memory bank 38 via buffer 26, simultaneously, the same dataword and checkbits written to memory bank 38 are applied to the read-only port 137 of EDC module 36. Likewise, EDC module 36 writes the other 32-bit dataword to memory devices 48 of memory bank 42 via buffer 28 and the 8 checkbits associated with that particular dataword to memory device 49 of memory bank 42. The dataword and checkbits written to memory bank 42 are simultaneously transferred to the read-only port 135 of EDC module 34.

Internal to EDC module 34, comparing device 54, FIG. 3, monitors the dataword and checkbits written to the shared memory 20 by EDC module 36 and processor 18. The comparing device compares the datawords applied to EDC module 34 by processor 16 and the checkbits generated thereby with the databits and checkbits written to memory bank 42 and input to EDC module 34 via its read-only port 135 and applied to comparing device 54 via I/O latches 52,53. comparing device 54 includes checkbit output compare logic 56 for comparing the checkbits generated for the two datawords by EDC module 34 with the checkbits input via its read-only port 135 written via processor 18 and EDC module 36 to memory bank 42. The comparing device 54 also includes memory data output compare circuitry 58 for comparing the datawords applied to EDC module 34 to datawords input via read-only port 135 written by EDC module 36 to memory bank 42. Likewise, EDC module 36 also includes a comparing device like comparing device 54 for comparing the two datawords applied thereto by processor 18 and the checkbits generated thereby to those applied from EDC module 34 to the read-only port 137 of EDC module 36. The EDC modules 34,36 operate in a master-slave or shadowlike fashion. EDC module 34 writing a first word and checkbits to memory with EDC module 36 monitoring the accuracy of such data, while EDC module 36 simultaneously writes a second word and checkbits to memory with EDC module 34 monitoring the accuracy of such data.

For generating the linear block codewords to be written to the shared memory 20, an H matrix or parity check matrix is used. Using the H matrix, a generator matrix is created therefrom as is known to one skilled in the art. The H matrix for the [80,64] linear block code in accordance with the present invention is shown by the H matrix 90, FIG. 4. The code generator matrix will have a number of rows equal to the rows of H matrix 90. The code generator 72 generates a checkbit by Exclusive-ORing the databits that correspond to a "1" in the checkbits's particular row as is known to one skilled in the art. Buffers 26 and 28 facilitate the writing of databits and checkbits from the EDC modules 34,36 to memory banks 38, 42, respectively. Buffer 26 and likewise buffer 28, connect databuses which are partitioned into four 8-bit wide increments corresponding to the four memory devices within each bank for storage of databits and another 8-bit wide increment corresponding to the one memory device in each bank for storage of checkbits. By utilizing this 8-bit wide boundary buffering arrangement, device faults are isolated to only a single 8-bit byte of information allowing for byte detection. This buffering arrangement is commonly referred to as data stubbing.

With an 80-bit codeword written across 10 memory devices 46–49 in shared memory 20, a read from common shared memory 20 shall now be described with reference to FIGS. 2–4. In a read from the shared common memory 20, each of the redundant processors 16,18 places the address of the memory location from which the linear block codeword is to be read on its respective address bus. The addresses are applied to BAG's(Master) 22,24 which then generate the control and address signals for access to the shared memory. The address lines are cross compared for signal integrity. The BAG's 22,24 are like the EDC modules 34,36 in that both implement self-checking logic which allows them the ability to detect faults. They implement this self-checking logic in "master-slave or shadow" operations. As one BAG or EDC module acts as the master, sending the signals, the other BAG or EDC module will be the slave or shadow, receiving and monitoring for "expected" values. This master-slave or shadow operation is shown by the flow of addresses among the BAG's. For example, the address issued by processor 16 is input to BAG(Master)22 and to BAG(Shadow)25. The addresses from processor 18 are applied to BAG(Master)24 and also to BAG(Shadow)23. BAG(Shadow) devices 23,25 provide the monitoring for the expected addresses to be applied to the memory 20. BAG (Master)22 outputs addresses to the common shared memory 20 and also to BAG(Shadow)23 for comparison with address applied thereto by processor 18. Likewise, BAG(Shadow)25 compares addresses from BAG(Master)24 and addresses applied thereto by processor 16. Such cross-comparison provides higher reliability and verification that the correct addresses are applied to memory 20.

The address from processor 16 which is decoded by BAG(Master) 22 is used to address the information in memory bank 38. The address from processor 18 which is the equivalent of the address from processor 16 is decoded by BAG(Master) 24 and utilized to address the information in memory bank 42. Each BAG 22,24 receives the same address from the processor 16,18, however, each BAG (Master) addresses only half of the entire 80-bit linear codeword. Simultaneously, memory bank 38 and memory bank 42 put the selected data called for by the addresses from BAG's 22,24 onto the 40-bit data bus connecting the common shared memory 20 with buffers 26,28.

As discussed briefly above, the databus is partitioned into 8-bit bus increments, often referred to as data stubs for byte-wide data buffering. If one data stub faults, it appears as a single bit memory fault. If two or more data stubs fault, this appears as a single byte-wide memory error. With the byte-wide boundary buffering, the 32-bit dataword and 8 checkbits from memory device 38 are applied to the read/write port 134 of EDC module 34 and simultaneously to the read-only port 137 of EDC module 36. Simultaneously, and by way of the byte-wide boundary buffering via buffer 28, the 32-bit dataword and 8 checkbits associated therewith of memory bank 42 are applied to the read/write port 136 of EDC module 36 and to the read-only port 135 of EDC module 34. As such, each EDC module 34,36 now has input thereto the entire 80-bit linear block codeword, half of the codeword addressed by each of the redundant processors 16,18. With one memory access, two words have been input to each EDC module 34,36. With the use of a linear block code leveraged over two datawords, such input of two datawords is allowable. The number of clock cycles required to access the two datawords is decreased and in conjunction with the pipelining of the data to the processors 16,18 after an error detection and correction cycle is conducted, throughput is improved.

With the entire 80-bit codeword input to each of the EDC modules 34,36, the error detection and correction cycle for a read shall be described with reference to FIG. 3. The description is in regard to EDC module 34 but is equally applicable as should be readily apparent to one skilled in the art to EDC module 36. Eight checkbits are applied to the read/write port 134 via buffer 26 and 8 checkbits are applied to the read-only port 135 via buffer 28. Also, one 32-bit dataword is applied to EDC module 34 at its read/write port 134 via buffer 26 and the other 32-bit dataword is applied at the read-only port 135 of EDC module 34 via buffer 28. As such, 16 checkbits are received by checkbit I/O latch 52 and 64 databits are received by memory data I/O latch 53.

The 16 checkbits and 64 databits are applied as the linear block codeword to the read error detection and correction circuit 60 wherein syndrome generator 62 Exclusive Or's the databits and checkbits that correspond to a "1" in particular rows of the H matrix 90 as is known to one skilled in the art. Sixteen syndromes or 16-bit vectors are generated based on the linear block codeword input to the read error detection and correction circuit 60. Error detection logic 64 and error correction logic 66 in response to the syndromes generated for a particular linear block codeword provide error detection and correction to the extent indicated previously with regard to the [80,64] code. The 64 bits of data are then applied to the processor I/O latch 80 and the 32-bit datawords are pipelined to processor 16. Such functions are carried out under synchronism of clock 88 and under the control of EDC mode controller 82 for generating enables and controls to the various elements of EDC module 34, and having registers 84 for starting and issuing such commands.

FIG. 5 shows in greater detail EDC module 34. Such detail shall be described first with regard to a write by the processor 16 to shared memory 20 and second with regard to a read by the processor 16 from shared memory 20. During a write, two 32-bit datawords are applied by processor 16 to the EDC module 34, one dataword at a time. The two datawords are applied to byte-word select 74 via unidirectional electrical connection represented in FIG. 5 by a one way arrow from the processor 16 to byte-word select 74. When two words are received by byte-word select 74, they are applied to the write checkbit generator 75 where 16 checkbits are generated utilizing a generator matrix based on the H matrix as discussed previously. The 64 bits representative of the two datawords from the byte-word select 74 are applied both to memory data multiplexer 108 and memory data comparator 58. The 16 checkbits generated by checkbit generator 75 are applied to checkbit enable multiplexer 106 which in turn applies the 16 checkbits to the memory data multiplexer 108 and checkbit comparator 56. The 8 checkbits to be written to memory bank 38 by EDC module 34 are selected by the multiplexer 106 and applied to checkbit output latch 94 which is then output through read/write port 134 of the EDC module 34 via buffer 26 to memory bank 38. At the same time, the 32-bit dataword to be written to memory bank 38 by EDC module 34 is selected by the memory data multiplexer 108 and applied to the memory data out latch 98 which in turn is applied to the memory bank 38 via the read/write port 134 and through buffer 26.

As described, only one half of the linear block codeword is written to the memory 20 via EDC module 34. The other half or 40 bits of the linear block codeword are written by the EDC module 36 which is a substantial equivalent to the EDC module 34 as shown in FIG. 5. The 40-bits of linear block code written to memory by EDC module 36 are verified with utilization of checkbit comparator 56 and memory data comparator 58 both having outputs which are input to error control 86. The memory data comparator 58 verifies the writing of the correct 32 bit dataword to the shared memory 20 by EDC module 36 and processor 18. The checkbit comparator 56 verifies the generation and writing of the correct 8 checkbits to the common shared memory 20 by EDC module 36 and processor 18. The read-only port 135 of the EDC module 34 receives the 32-bit dataword written to memory 20 by EDC module 36 and processor 18 at memory data input latch 96. The read-only port also receives the 8 checkbits written to memory by processor 18 and EDC module 36 at checkbit input latch 92. The 8 checkbits from checkbit input latch 92 are received by checkbit multiplexer 104 which selects and applies the 8 checkbits to checkbit comparator 56 for comparison with the checkbits received from checkbit enable multiplexer 106 as generated by checkbit generator 75. Likewise, the 32-bit dataword received by memory data input latch 96 from EDC module 36 is applied via multiplexers 100 and 102 to the memory data comparator 58 for comparison with the two 32-bit datawords received from the byte-word select 74.

The EDC module 34 and processor 16 has thus written one-half of the linear block codeword to the common shared memory 20 and verified the correctness of data written to the common shared memory 20 by EDC module 36 and processor 18. Similarly, EDC module 36 and processor 18 write the other half of the codeword to memory and verify the correctness of data written to the common shared memory 20 by EDC module 34 and processor 16.

FIG. 5 shall now be described with regard to a read of common shared memory 20 by processor 16. After the common shared memory 20 is addressed by processor 16,18, data is applied to the EDC module 34 in the following manner. A first 32-bit dataword is applied via buffer 26 as addressed by processor 16 and input to the read/write port 134 being received by memory data input latch 96. The second 32-bit dataword which is addressed by processor 18 is input via buffer 28 to the read-only port 135 of EDC module 34 also being received by memory data input latch 96. In a similar manner, 8 checkbits addressed by processor 16 are input via buffer 26 to the read/write port 134 of EDC module 34 being received by checkbit input latch 92. The second 8 checkbits of the 16 total checkbits are addressed by processor 18 and input via the read-only port 135 of EDC module 34 via buffer 28 also being received by checkbit input latch 92.

The total 16 checkbits are applied via 8 bit partitioned data lines to checkbit multiplexer 104 which in turn selects and applies the 8 checkbits received at the read/write port 134 and the 8 checkbits received at the read-only port 135 to the read checkbit generator 60. Likewise, the 32 bit dataword received at the read-only port 135 and the 32-bit dataword received at the read/write port 134 are applied to multiplexers 100, 102 which in turn selects and applies the two 32-bit datawords to a read checkbit generator 60. The multiplexers 100,102,104 align the data, lane for lane, so that the data is oriented before it reaches the read checkbit generator 60. As such, an appropriately aligned linear block codeword including 80 bits is applied to read checkbit generator 60. The two 32-bit datawords are also applied by the multiplexers 100,102 to error correction logic 66.

The read checkbit generator 60 includes syndrome generator 62 which as previously discussed performs Exclusive Or operations utilizing the H matrix 90 and generates 16 syndromes for input to the error correction logic 66 and error detection logic 64. The 16 syndromes are utilized by error correction logic to provide for correction of the two 32-bit datawords combined to make one 80-bit codeword input thereto by multiplexers 100,102. The corrected 32-bit datawords are then output to processor 16. One dataword is applied to the word selection multiplexer 112 for output to processor 16 and the other to processor latch 80 which provides for a pipelining of the second dataword to processor 16 after the first 32-bit word is output; the two 32-bit datawords being output to processor 16 in two clock cycles.

Whether correctable or uncorrectable errors are apparent is detected by the error detection logic 64 and signals representative of detected errors are output to error control logic 86. Error control logic 86 also receives signals from checkbit comparator 56 and memory data comparator 58. Such errors are then reported to the equipment utilizing the system. Substitution latch 107 allows for insertion of desired checkbits in order to test the system. The EDC module 34 is controlled by EDC mode controller 82 and synchronized by clock 88. Registers 84 are utilized by mode controller 82 for issuing commands to the various elements of the EDC module 34.

It should be readily apparent to one skilled in the art that the present invention could be utilized in a Harvard type architecture where instructions are fetched on separate instruction buses as distinct from separate data buses. In such an architecture, the passing of double processing words to the EDC logic blocks enhances throughput significantly. Four EDC modules would be utilized, two modules for each processor, one module for error detection and correction of instructions and the other for data.

Those skilled in the art will recognize that only preferred embodiments of the present invention have been disclosed herein, that other advantages may be found and realized, and that various modifications may be suggested by those versed in the art. It should be understood that the embodiments shown herein may be altered and modified without departing from the true spirit and scope of the invention as defined in the accompanying claims.

What is claimed is:

1. A fault-tolerant, fail passive digital computing system, said system comprising:
   a processor;
   a memory for storing at least one linear block codeword across a plurality of byte-wide memory devices, said codeword including a dataword and a plurality of checkbits associated therewith;
   a databus comprising a plurality of byte-wide partitions, the databus coupling the processor to the memory; and,
   an error detection and correction means connected to said processor and said memory on said databus for receiving said at least one linear block codeword from said memory or said processor, said error detection and correction means including a syndrome generator having an H matrix for detecting and correcting any single bit error in said linear block codeword transported on said databus such that any byte-wide errors in said linear block codeword are confined to one of said plurality of byte-wide partitions.

2. The system according to claim 1, wherein said error detection and correction means includes
   means for receiving a write dataword from said processor for communication to said memory, and,
   means for generating a plurality of checkbits based on said write dataword, wherein said means for generating uses an n,k linear block code where n is 80 and k is 64.

3. The system according to claim 1, wherein said H matrix is defined as:
   row 1=1100 0100 1100 0100 1100 0100 1100 0100 1100 0100 1100 0100 1100 0100 1100 0100 0000 0000 0000 0001
   row 2=1110 0000 1111 0000 1111 0000 1111 0000 1111 0000 1111 0000 1111 0000 1111 0000 0000 0000 0000 0010
   row 3=1010 1010 1010 1010 1010 1010 1010 1010 1010 1010 1010 1010 1010 1010 1010 1010 0000 0000 0000 0100
   row 4=0000 1101 0000 1101 0000 1101 0000 1101 0000 1101 0000 1101 0000 1101 0000 1101 0000 0000 0000 1000
   row 5=1100 1000 0110 0100 1011 0010 0101 1001 1010 1100 1101 0110 1110 1011 1111 0101 0000 0000 0001 0000
   row 6=0101 1001 1010 1100 1101 0110 1110 1011 1111 0101 0111 1010 0011 1101 0001 1110 0000 0000 0010 0000
   row 7=1011 0010 0101 1001 1010 1100 1101 0110 1110 1011 1111 0101 0111 1010 0011 1101 0000 0000 0100 0000
   row 8=0110 0100 1011 0010 0101 1001 1010 1100 1101 0110 1110 1011 1111 0101 0111 1010 0000 0000 1000 0000
   row 9=1011 1100 1010 1100 1010 1100 1010 1100 1010 1100 1010 1100 1010 1100 1010 1100 0000 0001 0000 0000
   row 10=0101 0110 0101 0110 0101 0110 0101 0110 0101 0110 0101 0110 0101 0110 0000 0010 0000 0000
   row 11=0011 0011 0010 0011 0010 0011 0010 0011 0010 0011 0010 0011 0010 0011 0010 0011 0000 0100 0000 0000
   row 12=1001 0001 1001 0001 1001 0001 1001 0001 1001 0001 1001 0001 1001 0001 1001 0001 0000 1000 0000 0000
   row 13=0000 0011 0010 0110 0100 1101 1001 1010 0011 0101 0110 1011 1101 0111 1010 1111 0001 0000 0000 0000
   row 14=1001 1010 0011 0101 0110 1011 1101 0111 1010 1111 0101 1110 1011 1100 0111 1000 0010 0000 0000 0000
   row 15=0101 1101 1001 1010 0011 0101 0110 1011 1101 0111 1010 1111 0101 1110 1011 1100 0100 0000 0000 0000
   row 16=0010 0110 0100 1101 1001 1010 0011 0101 0110 1011 1101 0111 1010 1111 0101 1110 1000 0000 0000 0000.

4. The system according to claim 1 wherein said data word portion of said codeword includes 64 data bits and wherein the number of said plurality of checkbits is 16.

5. The system according to claim 1 wherein said memory comprises a plurality of single byte memory devices, each single byte memory device being associated with one of the plurality of byte-wide partitions.

6. A method of storing data in a memory comprising:
   generating a first copy of the data at a first processor;
   providing the first copy of the data to a first error detector having a first read-only port and a first read/write port, the first read/write port being coupled to the memory;
   generating a second copy of the data at a second processor;
   providing the second copy of the data to a second error detector having a second read/write port and a second read-only port, the second read/write port being coupled to the memory and to the first read-only port, and the second read-only port being coupled to the first read/write port;
   generating a first set of checkbits at the first error detector based upon the first copy of the data;
   generating a second set of checkbits at the second error detector based upon the second copy of the data;
   providing a first output data from the first read/write port, the first output data comprising a first portion of the first copy of the data and a first portion of the first set of checkbits;
   providing a second output data from the second read/write port, the second output data comprising a second portion of the second copy of the data and a second portion of the second set of checkbits;
   monitoring the first output data at the second error detector;
   monitoring the second output data at the first error detector; and
   storing the first and second output data in the memory.

7. The method of claim 6 wherein the first portion of the data is equivalent to the second portion of the data.

8. The method of claim 6 wherein the first and second output data each comprise 40 bits.

9. The method of claim 8 wherein the first portion of the first copy of the data comprises 32 bits, the first portion of the first set of checkbits comprises 8 bits, the second portion of the second copy of the data comprises 32 bits, and the second portion of the second set of checkbits comprises 8 bits.

10. The method of claim 6 wherein the first and second sets of checkbits are generated by exclusive-OR'ing the first and second copies of the data, respectively, with a parity check matrix.

11. The method of claim 9 wherein the first and second sets of checkbits are generated by exclusive-OR'ing the first and second copies of the data, respectively, with a parity check matrix.

12. The method of claim 6 wherein the memory comprises a plurality of single-byte memory devices.

13. The method of claim 12 whereby the first and second error detectors are coupled to the memory through a first buffer and a second buffer, respectively, each buffer being capable of facilitating the writing of the first and second output data, respectively, to the memory.

14. The method of claim 13 whereby the first and second buffers write the first and second output data, respectively, to the memory through a databus comprising a plurality of byte-wide partitions, each partition being associated with one of the plurality of single-byte memory addresses.

15. A system for exchanging data having a first portion and a second portion between a first processor, a second processor and a shared memory, the system comprising:
a first error detector associated with the first processor having a first port and a second port, the second port being coupled to the memory; and
a second error detector having a third port and a fourth port, the third port being coupled to the memory and to the first port, and the fourth port being coupled to the second port;

whereby the first and second error detector each comprise a parity check matrix for generating a plurality of checkbits from the data, and whereby the first error detector provides first output data which comprises the first portion of the data via the second port, and whereby the second error detector provides second output data which comprises a second portion of the data via the third port, and whereby the first error detector monitors the second portion of the data via the first port based upon the plurality of checkbits, and whereby the second error detector monitors the first portion of the data via the fouth port based upon the plurality of checkbits.

16. The method of claim 15 wherein the first and second output data each comprise 32 bits.

17. The method of claim 15 wherein the checkbits are generated by exclusive-OR'ing the data with the parity check matrix.

18. The method of claim 15 wherein the memory comprises a plurality of single-byte memory devices.

19. The method of claim 18 whereby the first and second error detectors are coupled to the memory through a first buffer and a second buffer, respectively, each buffer being capable of facilitating the writing of the first and second output data, respectively, to the memory.

20. The method of claim 19 whereby the first and second buffers write the first and second output data, respectively, to the memory through a databus comprising a plurality of byte-wide partitions, each partition being associated with one of the plurality of single-byte memory addresses.

* * * * *